United States Patent
Boyle et al.

(10) Patent No.: US 7,111,116 B1
(45) Date of Patent: Sep. 19, 2006

(54) REDUCING MICRO-CONTROLLER ACCESS TIME TO DATA STORED IN A REMOTE MEMORY IN A DISK DRIVE CONTROL SYSTEM

(75) Inventors: William B. Boyle, Lake Forest, CA (US); Robert H. Krebs, Jr., San Juan Capistrano, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 272 days.

(21) Appl. No.: 10/676,739

(22) Filed: Sep. 30, 2003

(51) Int. Cl.
*G06F 12/12* (2006.01)
(52) U.S. Cl. .................................................. 711/113
(58) Field of Classification Search .................. 711/3, 711/118, 136, 137, 213, 113; 712/237; 715/703
See application file for complete search history.

(56) References Cited

U.S. PATENT DOCUMENTS

| | | | | |
|---|---|---|---|---|
| 5,345,560 A | * | 9/1994 | Miura et al. | 711/3 |
| 5,367,657 A | * | 11/1994 | Khare et al. | 711/118 |
| 5,499,335 A | * | 3/1996 | Silver et al. | 715/703 |
| 5,652,858 A | * | 7/1997 | Okada et al. | 711/137 |
| 5,692,168 A | * | 11/1997 | McMahan | 712/237 |
| 5,822,790 A | * | 10/1998 | Mehrotra | 711/213 |
| 6,292,871 B1 | * | 9/2001 | Fuente | 711/136 |
| 6,341,335 B1 | * | 1/2002 | Kanai et al. | 711/137 |
| 6,360,299 B1 | * | 3/2002 | Arimilli et al. | 711/137 |
| 6,393,528 B1 | * | 5/2002 | Arimilli et al. | 711/137 |

\* cited by examiner

*Primary Examiner*—Pierre Bataille
*Assistant Examiner*—Paul Schlie
(74) *Attorney, Agent, or Firm*—Jason T. Evans, Esq.; Howard H. Sheerin, Esq.

(57) ABSTRACT

A method and system for reducing micro-controller access time to information stored in the remote memory via the buffer manager in a disk drive control system comprising a micro-controller, a micro-controller cache system having a plurality of line-cache segments grouped into at least one line-cache segment-group, and a buffer manager communicating with the micro-controller cache system and a remote memory. The method and system includes receiving in the micro-controller cache system a current data-request from the micro-controller, providing the current requested data to the micro-controller if the current requested data resides in a first line-cache segment of a first segment-group, and automatically filling a second line-cache segment of the first segment-group with data retrieved from the remote memory wherein the retrieved data is sequential in the remote memory to the provided current requested data.

17 Claims, 5 Drawing Sheets

REDUCING MICRO-CONTROLLER ACCESS TIME TO DATA STORED IN A REMOTE MEMORY IN A DISK DRIVE CONTROL SYSTEM

FIELD OF THE INVENTION

This invention relates to disk drive control systems. More particularly, the present invention is directed to a method for reducing micro-controller access time to the information stored in a remote memory in the disk drive control system.

BACKGROUND OF THE INVENTION

Disk drives are commonly employed in workstations, personal computers, portables and other computer systems to store large amounts of data in a readily-available form. Typically, the primary components of a disk drive are a head disk assembly, and a printed circuit board assembly having a disk drive control system mounted thereon, which when fixed to one another form a functional unit that is then connected to a computer, such as by insertion into a bay of a host computer.

A disk drive control system typically includes a microprocessor, a buffer or memory manager, and several memory arrays such as dynamic random access memory (DRAM), static random access memory (SRAM), and non volatile memory such as read only memory (ROM), which communicate over one or more busses for transfer of digital data. The buffer manager arbitrates shared access to the information stored in the DRAM between the microprocessor and various components of the disk drive that periodically access the stored data.

Preferably, a cache system is employed to improve microprocessor performance by caching program data in a small cache memory which provides significantly faster access time than the aforementioned shared DRAM array. In many contemporary control systems, the cache memory is embedded in an integrated circuit for improved speed and economy. In alternative embodiments, the cache memory may be in one or more separate external integrated circuits. For either the internal or external case, the cache memory is relatively expensive, therefore an inefficient cache design may create a cost penalty.

Accordingly, what is needed is an improved cache memory architecture which provides improved microprocessor performance without incurring a disproportionate cost penalty.

SUMMARY OF THE INVENTION

This invention can be regarded as a method for reducing micro-controller access time to information stored in the remote memory via the buffer manager in a disk drive control system comprising a micro-controller, a micro-controller cache system having a plurality of line-cache segments grouped into at least one line-cache segment-group, and a buffer manager communicating with the micro-controller cache system and a remote memory.

The method includes receiving in the micro-controller cache system a current data-request from the micro-controller, providing the current requested data to the micro-controller if the current requested data resides in a first line-cache segment of a first segment-group, and automatically filling a second line-cache segment of the first segment-group with data retrieved from the remote memory wherein the retrieved data is sequential in the remote memory to the provided current requested data.

This invention can also be regarded as a disk drive control system comprising a micro-controller, a micro-controller cache system having a plurality of line-cache segments grouped into at least one line-cache segment-group, and a buffer manager communicating with the micro-controller cache system and a remote memory.

The disk drive control system further includes the micro-controller cache system that is adapted to: a) receive a current data-request from the micro-controller, b) provide the current requested data to the micro-controller if the current requested data resides in a first line-cache segment of a first segment-group, and c) automatically fill a second line-cache segment of the first segment-group with data retrieved from the remote memory wherein the retrieved data is sequential in the remote memory to the provided current requested data.

DETAILED DESCRIPTION OF THE INVENTION

Figure 1:
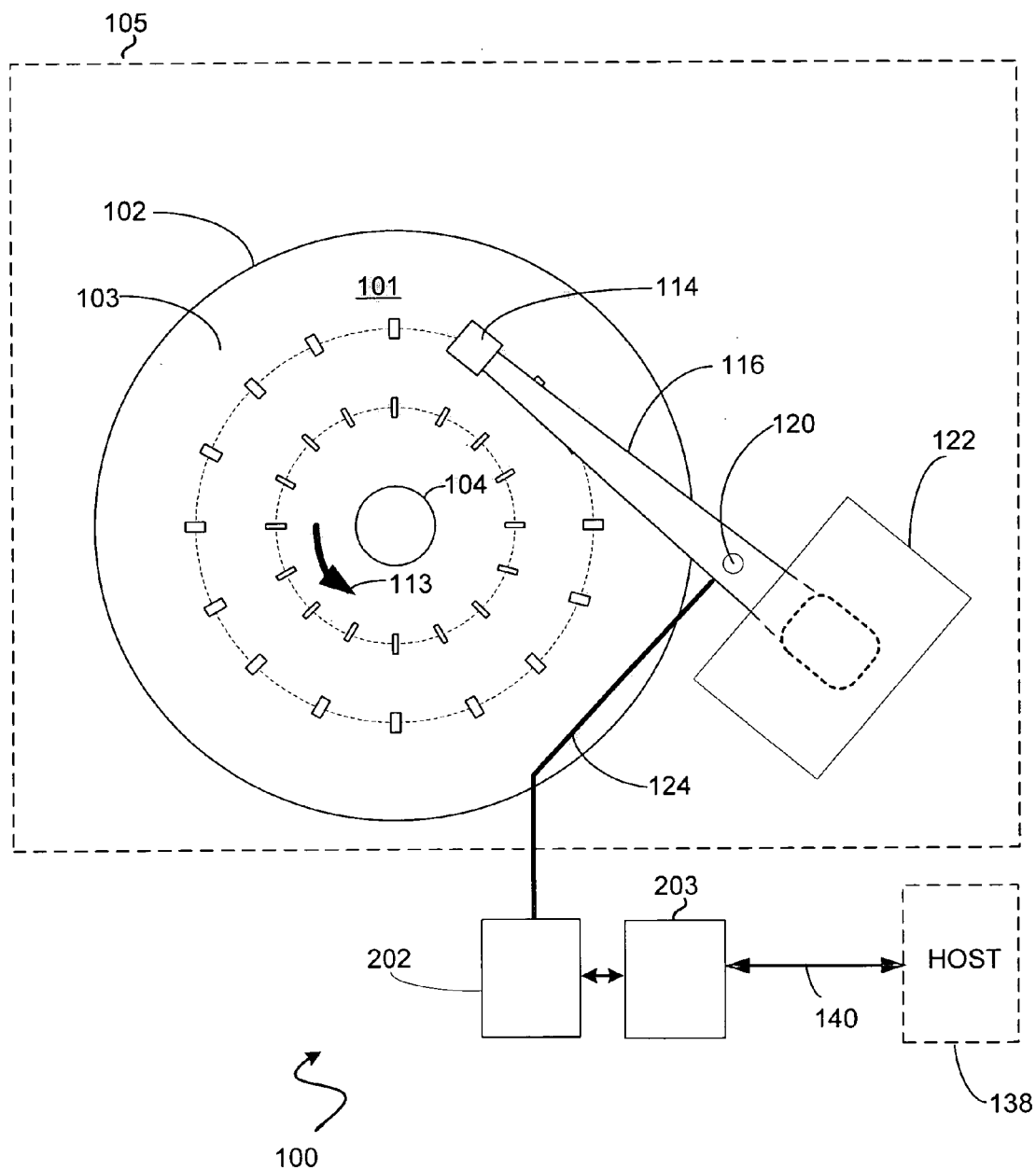
FIG. 1 illustrates an exemplary hard disk drive in which the present invention may be practiced.

With reference to FIG. 1, an exemplary hard disk drive 100 in which the present invention may be practiced is shown. As shown, the hard disk drive 100 includes a head disk assembly (HDA) 105 having one or more disks 102 with a magnetic media 101 formed on each surface 103 of a disk 102. The HDA 105 further comprises a transducer head 114 mounted on a rotary actuator 116 that rotates about a pivot 120 via controlled torques applied by a voice coil motor 122. While the disk drive 100 is in operation, the disk 102 rotates in an exemplary direction 113 about the axis of the spindle 104 at a substantially fixed angular speed such that the surface 103 of the disk 102 moves relative to the head 114.

As shown in FIG. 1, a signal bus 124, such as a flex cable, interconnects the HDA 105 to a control system 202 which can control the movement of the actuator 116 in a manner well known in the art. In addition, the control system 202 sends to and receives signals from the head 114 during read and write operations performed on the disk 102. As also shown in FIG. 1, the control system 202 is interconnected to the interface control system 203 which is in turn interconnected to a host computer 138 by a bus 140 for transferring of data between the hard disk drive 100 and the host 138.

Figure 2A:
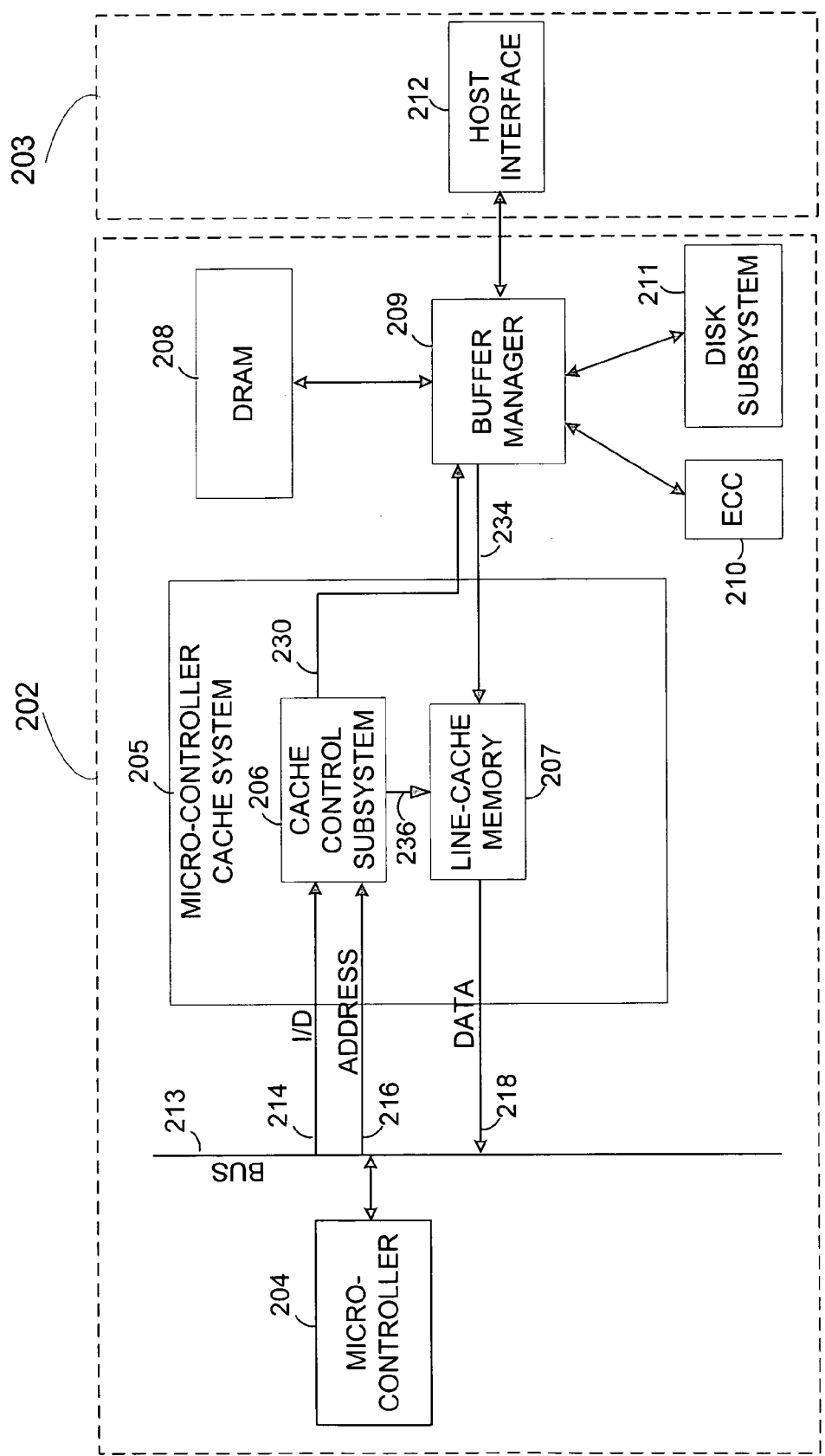
FIGS. 2A–B illustrate diagrams of an exemplary control system of the disk drive shown in FIG. 1.

FIG. 2A is a block a diagram of an embodiment of the control system 202 of a disk drive shown in FIG. 1. As shown in FIG. 2A, the control system 202 comprises a micro-controller 204, a micro-controller cache system 205 communicating with the micro-controller 204 via the address input 216 and data output 218. Micro-controller 204 can be a microprocessor or a Digital Signal Processor (DSP) or other suitable programmable logic arrangement. Further Micro-controller 204 may be a discrete device or an embedded logic core in an integrated circuit. Micro-controller cache-system 205 may suitably be implemented as discrete logic, or embedded in Micro-controller 204, or embedded logic in a large scale integrated circuit. The micro-controller cache system 205 is further adapted to store micro-controller data for access by the micro-controller 204. The control system 202 further comprises a buffer manager 209 communicating with the micro-controller cache system 205, a remote memory 208, such as dynamic random access memory (DRAM), and control system clients such as error correction code subsystem 210, host interface subsystem 212 residing in the interface control system 203, and disk subsystem 211 which comprises a read/write channel (not shown), a voice coil motor driver (not shown), and a spindle motor driver (not shown). The buffer manager 209 is adapted to provide the micro-controller cache system 205 with micro-controller requested data stored in the remote memory 208. In an exemplary embodiment, the micro-controller 204 is an Advanced RISC (reduced instruction set computer) Machine (ARM) microprocessor with an ARM 'C' compiler. In an exemplary embodiment, the DRAM 208 is a Synchronous DRAM (SDRAM) having an access time of 5.5 nsec, such as SDRAM model K4S161622E-TC60 by Samsung or model W981616BH-6 by Winbond.

Figure 2B:
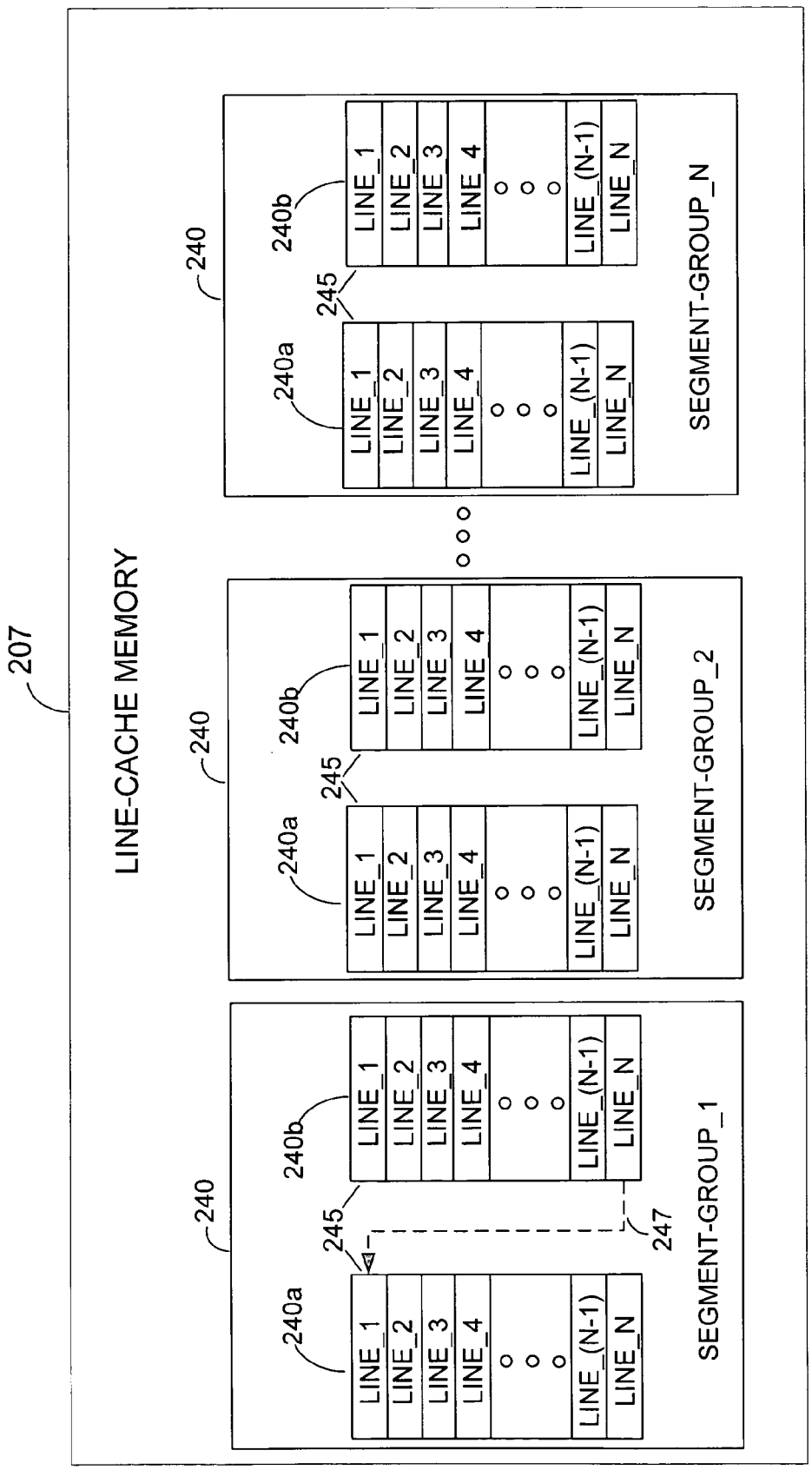
Figure 3:
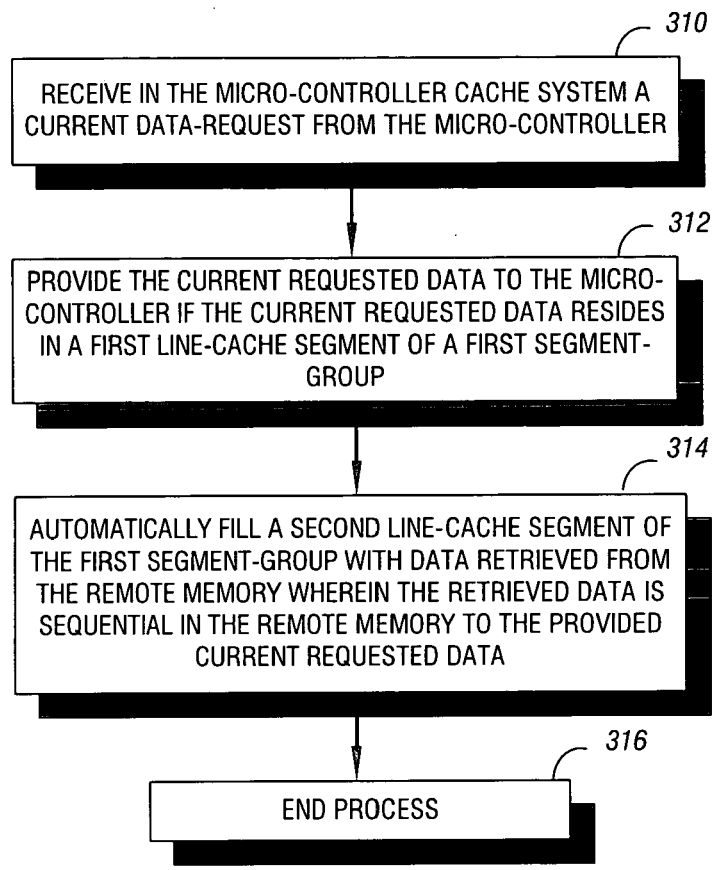
FIG. 3 is a flow chart illustrating a process used in an embodiment of the invention.

FIG. 3 in conjunction with FIG. 2A and FIG. 2B illustrate a process of the present invention for reducing micro-controller access time to information stored in the remote memory 208 via the buffer manager 209. The process starts in block 310 where a current data-request 216 from the micro-controller 204 is received in the cache control subsystem 206, such as via a data bus 213. In an exemplary embodiment, the data bus 213 is Advanced High-Performance Bus (AHB) of an Advanced Micro-controller Bus Architecture (AMBA) by Advance RISC Machines (ARM) Inc. As shown in FIG. 2B, the line-cache memory 207 comprises a plurality of line-cache segments such as two line-cache segments 240*a* and 240*b*, each having at least a cache line 245, such as line_1 through line_N. The line-cache segments 240*a* and 240*b* are in turn grouped into at least one, or a plurality of, line-cache segment-groups 240, such as segment-group_1 through segment-group_N. Returning to FIG. 3, in block 312 the current requested data is provided to the micro-controller 204 if the requested data reside in the line-cache memory 207. Suitably, the cache-control subsystem 206 determines if the current requested data resides in a line-cache segment of a segment-group, such as line-cache segment 240*a* of the segment-group_1, and via an instruction 236 to line-cache memory 207 provides the requested data to the micro-controller 204 via path 235 and buses 218 and 213.

Next, in block 314, the cache-control subsystem 206 automatically fills a second line-cache segment of the cache segment-group in which the current requested data resides, such as line-cache segment 240*b* of the segment-group_1, with data retrieved from the remote memory 208 wherein the retrieved data is sequential in the remote memory 208 to the provided current requested data. Suitably, the retrieved data comprises a burst of data in the range of 32 to 64 bytes. The flow then proceeds to block 316 in which the overall process ends.

Figure 4:
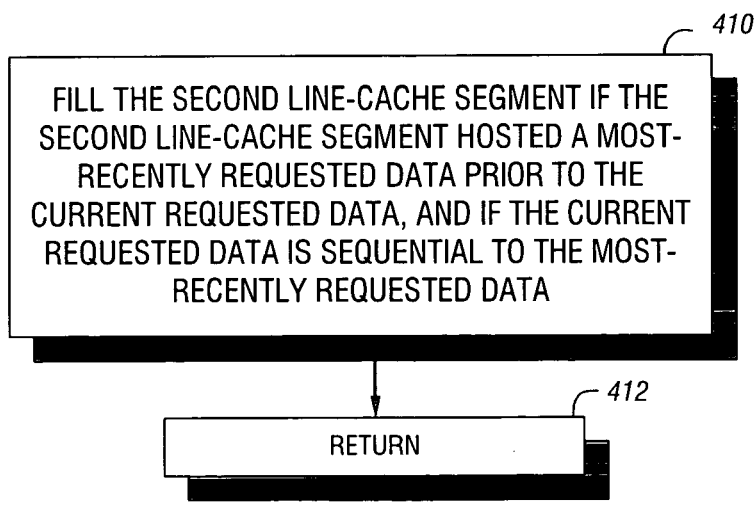
FIG. 4 is a flow chart further illustrating the process used in an embodiment of the invention shown in FIG. 3.

FIG. 4 further illustrates the automatic fill process described in block 314 of FIG. 3. As shown in FIG. 4, the process begins in block 410 where the second line-cache segment of the cache segment-group in which the current requested data resides, such as line-cache segment 240*b* of the segment-group_1, is filled if the second line-cache segment 240*b* hosted a most-recently requested data prior to the current requested data (i.e. it was the line-cache segment of the last cache hit) and suitably if the current requested data is sequential to the most-recently requested data. An exemplary illustration of the above scenario is shown in FIG. 2B wherein the current requested data resides in line-cache segment 240*a* of the segment-group_1. The line-cache segment 240*b* is then filled if a) the last hit prior to the current data-request occurred in line-cache segment 240*b* of segment-group_1; and b) if the last prior hit occurred in line_N of segment 240*b* and the current requested data sequentially resides in line_1 of line-cache segment 240*a* of segment-group_1, as symbolically shown by arrow 247. The automatic fill is thus predicated in part on the sequential boundary crossing between the line-cache segments in a segment-group. Returning to FIG. 4, the flow then proceeds to block 412 for return to block 314 of FIG. 3.

Figure 5:
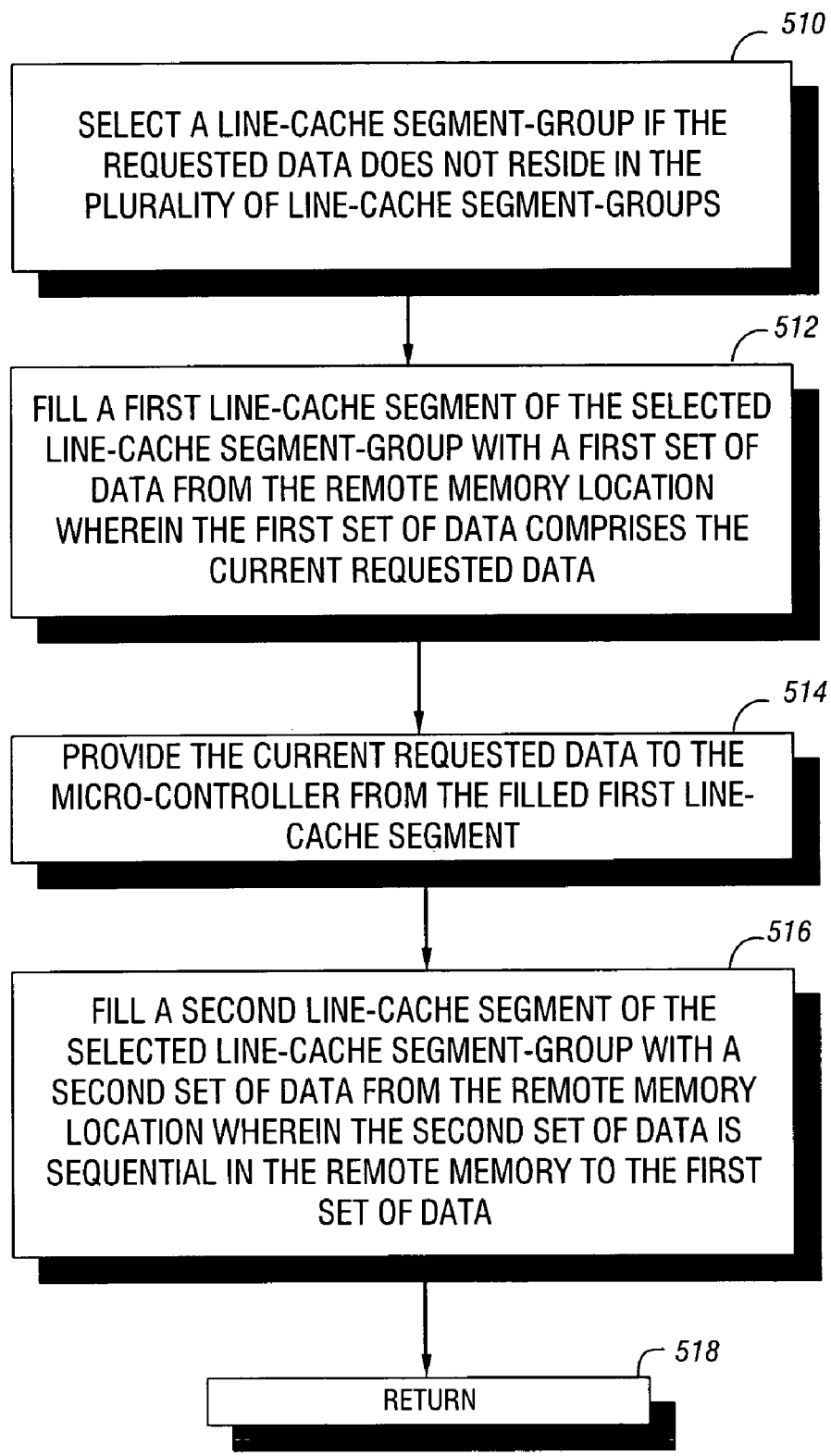
FIG. 5 is another flow chart further illustrating the process used in an embodiment of the invention shown in FIG. 3.

FIG. 5 in conjunction with FIG. 2B illustrate the further processes used in the embodiment of the invention shown in FIG. 3. As shown in FIG. 5, the process begins in block 510 in which a line-cache segment-group 240, such as segment-group_2, is selected if the current requested data does not reside in any of the line-cache segment-groups 1 through N. Suitably, the selected line-cache segment-group, such as segment-group_2, is a least recently used line-cache segment-group. Next, in block 512, a first line-cache segment of the selected line-cache segment-group, such as line-cache segment 240*a* in segment-group_2, is filled with a first set of data from the remote memory 208 wherein the first set of data comprises the current requested data. Next, in block 514, the current requested data is provided to the micro-controller 204 from the filled first line-cache segment. Next, in block 516, a second line-cache segment of the selected line-cache segment-group, such as line-cache segment 240*b* in segment-group_2, is filled with a second set of data from the remote memory 208 wherein the second set of data is sequential in the remote memory 208 to the first set of data. Suitably, the first set of data comprises a first burst of data in the range of 32 to 64 bytes, and the second set of data comprises a second burst of data in the range of 32 to 64 bytes. Next, the flow then proceeds to block 518 for return to block 316 of FIG. 3 in which the overall process ends.

One advantage of the foregoing feature of the present invention over the prior art is that by automatically (and thus anticipatorily) filling a second line-cache segment of a line-cache segment-group with sequential data even when the current requested data resides in a first line-cache segment of the line-cache segment-group, the present invention provides a more efficient line-cache memory architecture to improve microprocessor performance without incurring a disproportionate cost penalty.

It should be noted that the various features of the foregoing embodiments were discussed separately for clarity of description only and they can be incorporated in whole or in part into a single embodiment of the invention having all or some of these features.

What is claimed is:

1. In a disk drive control system comprising a micro-controller, a micro-controller cache system having a plurality of line-cache segments grouped into at least one line-cache segment-group, and a buffer manager communicating with the micro-controller cache system and a remote memory, a method for reducing the micro-controller access time to information stored in the remote memory via the buffer manager, the method comprising:

receiving in the micro-controller cache system a current data-request from the micro-controller; and if the current requested data resides in a first line-cache segment of a first segment group:
providing the current requested data to the micro-controller; and
automatically filling a second line-cache segment of the first segment-group with data retrieved from the remote memory wherein the retrieved data is sequential in the remote memory to the provided current requested data if it is determined that the second line-cache segment hosted a most-recently requested data prior to the current requested data.

2. The method of claim 1, wherein the automatically filling further comprises:
filling the second line-cache segment if the current requested data is sequential to the most-recently requested data.

3. The method of claim 1, wherein the retrieved data comprises a burst of data in the range of 32 to 64 bytes.

4. The method of claim 1, wherein the plurality of line-cache segments are grouped into a plurality of line-cache segment-groups.

5. The method of claim 4, further comprising:
if the current requested data does not reside in the plurality of line-cache segment-groups:
selecting a line-cache segment-group;
filling a first line-cache segment of the selected line-cache segment-group with a first set of data from the remote memory location wherein the first set of data comprises the current requested data;
providing the current requested data to the micro-controller from the filled first line-cache segment; and
filling a second line-cache segment of the selected line-cache segment-group with a second set of data from the remote memory location wherein the second set of data is sequential in the remote memory to the first set of data.

6. The method of claim 5, wherein the selected line-cache segment-group is a least recently used line-cache segment-group.

7. The method of claim 5, wherein the first set of data comprises a first burst of data in the range of 32 to 64 bytes.

8. The method of claim 5, wherein the second set of data comprises a second burst of data in the range of 32 to 64 bytes.

9. The method of claim 1, wherein the line-cache segment-group comprises two line-cache segments.

10. The method of claim 1, wherein the remote memory comprises a dynamic random access memory (DRAM).

11. The method of claim 1, wherein the buffer manager is in communication with a plurality of control system clients and provides client-requested data to the clients from the remote memory.

12. The method of claim 11, wherein the plurality of control system clients comprises at least one of a disk subsystem, an error correction code subsystem, and a host interface subsystem.

13. A disk drive control system comprising:
a micro-controller,
a micro-controller cache system having a plurality of line-cache segments grouped into at least one line-cache segment-group, and
a buffer manager communicating with the micro-controller cache system and a remote memory,
wherein the micro-controller cache system is adapted to:
a) receive a current data-request from the micro-controller, and if the current requested date resides in a first line-cache segment of a first segment-group, b) provide the current requested data to the micro-controller, and c) automatically fill a second line-cache segment of the first segment-group with data retrieved from the remote memory wherein the retrieved data is sequential in the remote memory to the provided current requested data if it is determined that the second line-cache segment hosted a most-recently requested data prior to the current requested data.

14. The disk drive control system of claim 13, wherein the micro-controller cache system automatically fills the second line-cache segment if the current requested data is sequential to the most-recently requested data.

15. The disk drive control system of claim 13, wherein the plurality of line-cache segments are grouped into a plurality of line-cache segment-groups.

16. The disk drive control system of claim 15, wherein the micro-controller cache system is further adapted to, if the current requested data does not reside in the plurality of line-cache segment-groups, a) select a line-cache segment-group; b) fill a first line-cache segment of the selected line-cache segment-group with a first set of data from the remote memory location wherein the first set of data comprises the current requested data; c) provide the current requested data to the microcontroller from the filled first line-cache segment; and d) fill a second line-cache segment of the selected line-cache segment-group with a second set of data from the remote memory location wherein the second set of data is sequential in the remote memory to the first set of data.

17. The disk drive control system of claim 16, wherein the selected line-cache segment-group is a least recently used line-cache segment-group.

* * * * *

UNITED STATES PATENT AND TRADEMARK OFFICE
CERTIFICATE OF CORRECTION

| | | |
|---|---|---|
| PATENT NO. | : 7,111,116 B1 | Page 1 of 1 |
| APPLICATION NO. | : 10/676739 | |
| DATED | : September 19, 2006 | |
| INVENTOR(S) | : Boyle et al. | |

It is certified that error appears in the above-identified patent and that said Letters Patent is hereby corrected as shown below:

Col. 6, Line 16 (Claim 13, Line 10): After "requested", delete "date" and insert -- data --.

Signed and Sealed this

Third Day of June, 2008

JON W. DUDAS
*Director of the United States Patent and Trademark Office*